United States Patent
Hoffman et al.

(10) Patent No.: US 12,213,605 B2
(45) Date of Patent: Feb. 4, 2025

(54) WALL ANCHORS AND ASSEMBLIES FOR HEAVYWEIGHT OBJECTS

(71) Applicant: 3M INNOVATIVE PROPERTIES COMPANY, St. Paul, MN (US)

(72) Inventors: Joseph A. Hoffman, Minneapolis, MN (US); Mario A. Davenport, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 74 days.

(21) Appl. No.: 17/637,542

(22) PCT Filed: Aug. 20, 2020

(86) PCT No.: PCT/IB2020/057813
§ 371 (c)(1),
(2) Date: Feb. 23, 2022

(87) PCT Pub. No.: WO2021/038389
PCT Pub. Date: Mar. 4, 2021

(65) Prior Publication Data
US 2022/0279945 A1    Sep. 8, 2022

Related U.S. Application Data

(60) Provisional application No. 62/891,626, filed on Aug. 26, 2019.

(51) Int. Cl.
*A47G 1/20*    (2006.01)
*F16M 13/02*    (2006.01)

(52) U.S. Cl.
CPC ............... *A47G 1/20* (2013.01); *F16M 13/02* (2013.01)

(58) Field of Classification Search
CPC ................................ A47G 1/20; F16M 13/02
USPC ......................................... 248/231.91, 216.1
See application file for complete search history.

(56) References Cited

U.S. PATENT DOCUMENTS

| | | |
|---|---|---|
| 365,725 A | 6/1887 | Buckland |
| 1,185,587 A | 5/1916 | Bragg |
| 1,651,392 A | 12/1927 | Honigbaum |
| 2,383,658 A | 8/1945 | Larson |
| 2,497,615 A | 2/1950 | Lux |
| 2,751,807 A | 6/1956 | Harre |

(Continued)

FOREIGN PATENT DOCUMENTS

| | | |
|---|---|---|
| EP | 1346675 | 9/2003 |
| JP | 2016-023689 A | 2/2016 |

(Continued)

OTHER PUBLICATIONS

"Encyclopedia of Polymer Science and Engineering", Interscience Publishers, 1988, vol. 13, pp. 1-3.

(Continued)

*Primary Examiner* — Todd M Epps (57) ABSTRACT

A wall hook comprising at least a base plate including opposing front and back surfaces, a top edge, a bottom edge and two opposing side edges; a downwardly curved prong having a base, wherein the prong extends outwardly along an arc to a wall-penetrating end, a load bearing structure adjacent the top edge, and an alignment notch at the bottom edge, wherein the base of the prong is integral with one of the opposing sides edges.

19 Claims, 5 Drawing Sheets

(56) References Cited

U.S. PATENT DOCUMENTS

| | | | |
|---|---|---|---|
| 3,020,602 A | 2/1962 | Siering | |
| 3,298,651 A | 1/1967 | Passer | |
| 3,416,821 A | 12/1968 | Benno | |
| 3,966,157 A | 6/1976 | Corral | |
| 4,040,149 A | 8/1977 | Einhorn | |
| 4,124,189 A | 11/1978 | Einhorn | |
| 4,300,745 A | 11/1981 | Peterson | |
| 4,325,528 A | 4/1982 | Martin | |
| 4,333,625 A | 6/1982 | Haug | |
| 4,422,608 A | 12/1983 | Hogg | |
| 4,485,995 A | 12/1984 | Hogg | |
| 4,509,713 A | 4/1985 | Hogg | |
| 4,524,506 A | 6/1985 | Wilke | |
| 4,613,108 A | 9/1986 | Sundstroem et al. | |
| 4,621,473 A | 11/1986 | Wendt | |
| 4,637,583 A | 1/1987 | Babitz | |
| 4,771,974 A | 9/1988 | Carlson | |
| 4,795,294 A | 1/1989 | Takada et al. | |
| 5,267,719 A | 12/1993 | Keller | |
| 5,269,485 A | 12/1993 | Dwinell | |
| 5,296,277 A | 3/1994 | Wilson | |
| 5,437,429 A | 8/1995 | Atlas | |
| 5,516,581 A | 5/1996 | Kreckel | |
| 5,588,629 A | 12/1996 | Barnes | |
| 5,795,636 A | 8/1998 | Keller | |
| 5,878,988 A | 3/1999 | Rakower | |
| 6,095,465 A | 8/2000 | Weck | |
| 6,106,937 A | 8/2000 | Hamerski | |
| 6,126,126 A | 10/2000 | McKiernan, Jr. | |
| 6,206,334 B1 | 3/2001 | Weck | |
| 6,231,962 B1 | 5/2001 | Bries | |
| 6,325,345 B1 | 12/2001 | Carpenter | |
| 6,371,427 B1 | 4/2002 | Johnson | |
| 6,395,389 B1 | 5/2002 | Lühmann | |
| 6,403,206 B1 | 6/2002 | Bries | |
| 6,431,510 B1 | 8/2002 | Lydecker | |
| 6,478,273 B1 | 11/2002 | McKiernan, Jr. | |
| 6,572,945 B2 | 6/2003 | Bries | |
| 6,830,228 B2 | 12/2004 | Ernst | |
| 6,972,141 B1 | 12/2005 | Bries | |
| 7,078,093 B2 | 7/2006 | Sheridan | |
| 7,398,623 B2 | 7/2008 | Martel et al. | |
| 7,497,028 B2 | 3/2009 | Nevers | |
| 7,781,056 B2 | 8/2010 | Bries | |
| 7,836,604 B2 | 11/2010 | Paharik | |
| 8,318,303 B2 | 11/2012 | Lu | |
| 8,414,239 B2 | 4/2013 | MCDuff | |
| 8,667,765 B1 * | 3/2014 | McCarthy | E04F 13/0828 52/745.1 |
| 8,740,171 B2 | 6/2014 | Crescenzo | |
| 9,261,229 B2 | 2/2016 | Callif | |
| 9,775,450 B2 * | 10/2017 | Will | A47G 1/20 |
| 9,894,931 B2 | 2/2018 | Zhou | |
| 9,920,783 B2 | 3/2018 | Runge | |
| 10,197,217 B2 | 2/2019 | Will et al. | |
| 10,454,190 B1 | 10/2019 | Martin | |
| 10,687,639 B2 | 6/2020 | Kan | |
| 10,772,444 B2 * | 9/2020 | Stas | A47G 1/22 |
| 10,895,099 B2 | 1/2021 | Vos | |
| 11,300,245 B2 * | 4/2022 | Will | A47G 1/205 |
| 2003/0066941 A1 | 4/2003 | Beaty et al. | |
| 2003/0127578 A1 | 7/2003 | Skorka | |
| 2003/0178545 A1 | 9/2003 | Ernst | |
| 2004/0065027 A1 | 4/2004 | Birss | |
| 2005/0252156 A1 | 11/2005 | Martel et al. | |
| 2006/0182517 A1 | 8/2006 | McDuff | |
| 2007/0124910 A1 | 6/2007 | Peterson et al. | |
| 2007/0235622 A1 | 10/2007 | Baran | |
| 2007/0295879 A1 | 12/2007 | Wong | |
| 2008/0296456 A1 | 12/2008 | Lien | |
| 2010/0084539 A1 | 4/2010 | Popkin et al. | |
| 2011/0012006 A1 | 1/2011 | Serio | |
| 2012/0056051 A1 | 3/2012 | Gold | |
| 2014/0231604 A1 | 8/2014 | Long | |
| 2014/0326848 A1 | 11/2014 | Popkin | |
| 2015/0034104 A1 | 2/2015 | Zhou | |
| 2015/0035556 A1 | 2/2015 | Kaltalioglu | |
| 2015/0035960 A1 | 2/2015 | Nakamura | |
| 2015/0297002 A1 | 10/2015 | Long | |
| 2015/0308613 A1 | 10/2015 | Callif et al. | |
| 2016/0068722 A1 | 3/2016 | Schmitz-Stapela | |
| 2017/0000270 A1 | 1/2017 | Will | |
| 2017/0002973 A1 * | 1/2017 | Will | A47G 1/20 |
| 2017/0002974 A1 * | 1/2017 | Will | F16B 45/00 |
| 2017/0014733 A1 | 1/2017 | Massingill | |
| 2017/0015163 A1 | 1/2017 | Sielhorst | |
| 2017/0037892 A1 | 2/2017 | Higgins | |
| 2017/0112281 A1 | 4/2017 | Malott | |
| 2019/0307268 A1 | 10/2019 | Stas et al. | |
| 2021/0207645 A1 * | 7/2021 | Hoffman | A47G 1/20 |

FOREIGN PATENT DOCUMENTS

| | | | | |
|---|---|---|---|---|
| WO | WO 2015-035556 | 3/2015 | | |
| WO | WO 2015-035960 | 3/2015 | | |
| WO | WO 2016-160364 | 10/2016 | | |
| WO | WO 2016-200769 | 12/2016 | | |
| WO | WO 2017/003988 | 1/2017 | | |
| WO | WO-2017003988 A1 * | 1/2017 | | A47G 1/16 |
| WO | WO 2017/070149 | 4/2017 | | |
| WO | WO-2017070149 A1 * | 4/2017 | | A47B 96/06 |
| WO | WO 2017-136188 | 8/2017 | | |
| WO | WO 2017-136219 | 8/2017 | | |
| WO | WO 2019-217567 | 11/2019 | | |
| WO | WO 2019-226809 | 11/2019 | | |
| WO | WO 2019-226816 | 11/2019 | | |
| WO | WO-2019226809 A1 * | 11/2019 | | A47G 1/16 |

OTHER PUBLICATIONS

"Encyclopedia of Polymer Science and Technology", Interscience Publishers, 1964, vol. 01, pp. 1-24.

International Search Report for PCT International Application No. PCT/IB2020/057813, mailed on Sep. 28, 2020, 7 pages.

International Search Report for PCT International Application No. PCT/US2019/033582, mailed on Aug. 14, 2019, 7 pages.

International Search Report for PCT International Application No. PCT/US2019/033594, mailed on Aug. 16, 2019, 7 pages.

* cited by examiner

WALL ANCHORS AND ASSEMBLIES FOR HEAVYWEIGHT OBJECTS

CROSS REFERENCE TO RELATED APPLICATIONS

This application is a national stage filing under 35 U.S.C. 371 of PCT/IB2020/057813, filed 20 Aug. 2020, which claims the benefit of U.S. Provisional Application No. 62/891,626, filed 26 Aug. 2019, the disclosures of which are incorporated by reference in their entireties herein.

BACKGROUND

Numerous products and devices exist for installing a hook or hanging device in a wall, such as for hanging a picture frame, a mirror, or the like. Conventional nails and screws are not always convenient solutions and may not provide sufficient support strength in the wall, particularly in the case of drywall, or other friable wallboards, which are relatively weak. Other hanging devices may avoid the use and attendant drawbacks of conventional fasteners, but nonetheless may result in excessive damage to the wallboard, require the use of conventional tools, or fail to consistently hold the desired weight.

SUMMARY

The present inventors have devised a wall anchor construction and wall anchor assemblies that provide stronger support in load bearing directions than currently available solutions. The wall anchors and anchor assemblies may be installed without the use of tools and may be used to mount heavy weight objects like picture frames without damaging the wall or losing material fidelity. The anchors feature a base plate and one or more prongs that include a relatively high ratio of height to thickness, which can provide both an improved installation experience and more routinely successful mounting. The anchors may be combined with other components that allow for temporary attachment of an anchor assembly to the wall, letting a user iteratively select the best location for both the anchor and the object to be mounted without fully committing to the installation.

In one aspect, the present disclosure provides a wall anchor comprising: a base plate including opposing front and back surfaces, a top edge, a bottom edge and two opposing side edges; and a curved prong having a base, wherein the prong extends outwardly along an arc to a wall-penetrating outer end, and wherein the base of the prong is integral with one of the opposing side edges.

In another aspect, the present disclosure provides a wall anchor assembly comprising: a base plate a first insertion plate pivotally coupled to the base plate and including a proximal edge, a distal edge, and opposing side edges, the insertion plate further including a curved prong having a base, wherein the prong extends outwardly along an arc to a wall-penetrating outer end, and wherein the base of the prong is coincident with one of the opposing side edges. Such wall anchor assemblies may further comprise a second insertion plate pivotally coupled to the base plate and including a proximal edge, a distal edge, and opposing side edges. The second insertion plate can further include a second curved prong having a base, wherein the prong extends outwardly along an arc to a wall-penetrating outer end, and wherein the base of the prong is coincident with one of the opposing side edges of the second insertion plate.

As used herein, "layer" means a single stratum that may be continuous or discontinuous over a surface.

As used herein "geometry" refers to the size and shape of an element.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a", "an", and "the" are not intended to refer to only a singular entity, but include the general class of which a specific example may be used for illustration. The terms "a", "an", and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties). The term "substantially", unless otherwise specifically defined, means to a high degree of approximation (e.g., within +/−10% for quantifiable properties) but again without requiring absolute precision or a perfect match. Terms such as same, equal, uniform, constant, strictly, and the like, are understood to be within the usual tolerances or measuring error applicable to the particular circumstance rather than requiring absolute precision or a perfect match.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The disclosure will be further described with reference to the drawings, wherein corresponding reference characters indicate corresponding parts throughout the several views, and wherein.

Layers in certain depicted embodiments are for illustrative purposes only and are not intended to absolutely define the thickness, relative or otherwise, or the absolute location of any component. While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

DETAILED DESCRIPTION OF ILLUSTRATIVE EMBODIMENTS

While the above-identified figures set forth several embodiments of the disclosure other embodiments are also contemplated, as noted in the description. In all cases, this disclosure presents the invention by way of representation and not limitation. It should be understood that numerous other modifications and embodiments can be devised by those skilled in the art, which fall within the scope and spirit of the principles of the invention.

Figure 1:
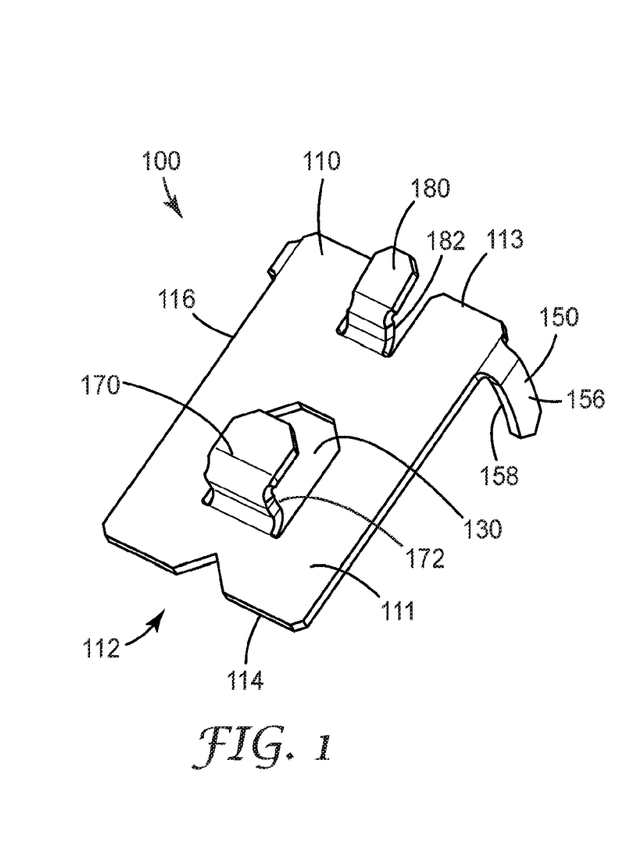
FIG. 1 illustrates a perspective view of a wall anchor, according to one embodiment of the present disclosure.
Figure 2:
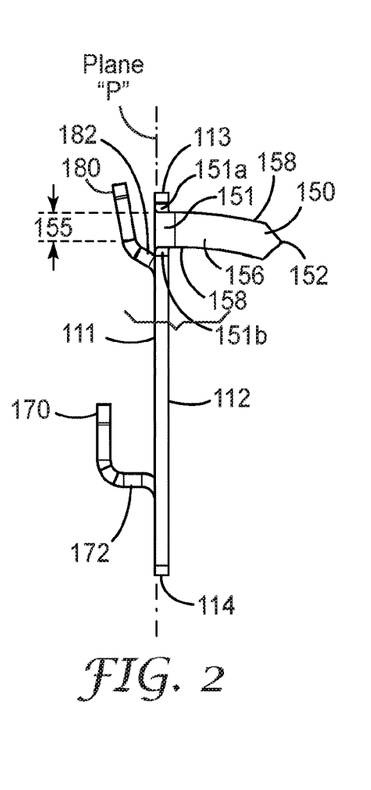
FIG. 2 is a side view of the wall anchor of FIG. 1.

A wall anchor 100 according to one embodiment of the present disclosure is depicted in FIGS. 1-4. The wall anchor 100 includes a base plate 110 presenting a compound rectangular shape (as seen in FIG. 2). The base plate 110 includes a front surface 111 opposing a back, wall-facing surface 112, a top edge 113, a bottom edge 114, and opposing side edges 115, 116 connecting the top and bottom edges 113, 114 to define an outer plate perimeter. A pair of downwardly curved prongs 150 extend from each side edge 115, 116 (see FIG. 3) in direction generally orthogonal to the back surface 112. The prongs 150 extend to an outer end 152 that can be tapered to ease insertion when pressed into wall board or other penetrable surface.

Figure 3:
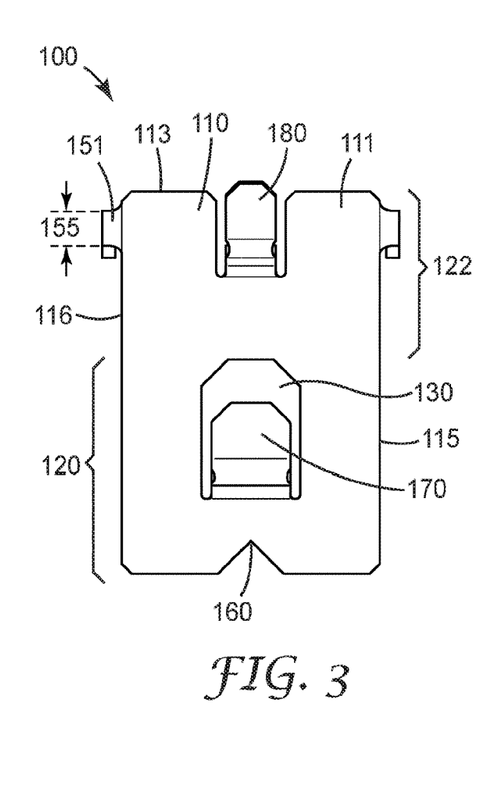
FIG. 3 is a front planar of the wall anchor of FIGS. 1-2.

The base 110 includes a lower section 120 including bottom edge 114 and an upper section 122 including the top edge 113. The sections 120 and 122 are typically coplanar and include front surfaces residing in a plane "P". The lower section 120 includes an open-ended region or recess 130 arranged generally aligned with the central axis of the base plate. The recess 130 generally corresponds in at least the width dimension to the width of a first load bearing structure 170. The base plate 110 has an overall, generally rectangular shape when viewed in a plane perpendicular to the base plate plane "P". In other embodiments, the base plate 110 present another shape or combination of shapes in the same viewing direction, including circular, ovular, triangular tetrahedral, Y-shaped, etc. Other variations are contemplated and discernable by those of skill in the art.

The upper base section 122 includes a second load bearing structure 180, depicted here as a hook, near the top edge 113 for receiving e.g., a sawtooth on a frame or other article to be mounted. The hook 180 can also provide visual confirmation of the anchor 100 placement and orientation on a wall surface from behind a frame or other mounting article. The lower base section 120 includes an alignment notch 160 on the bottom edge 114. The alignment notch 160 can also provide visual confirmation of the anchor 100 placement and orientation on a wall surface, as well as presenting a location at which a user may mark the wall surface for subsequent placement of the anchor. The alignment notch 160 may be triangular as depicted to direct the stylus of a pen or other marking instrument to the desired location and may be sized and shaped to ensure a visible marking can be made on the surface. In other embodiments, the notch may be arcuate, rectangular, or other cognizable shape designed to communicate placement and accept the tip of a marking instrument. Other embodiments not depicted can feature an alignment notch of some or all of the other edges 114, 115, and 116.

The upper base section 120 includes a pair of curved prongs 150 proximate the top edge 113. The prongs 150 each extend to an outer end 152 over a length that is generally equal to or less than the thickness of the wallboard to which the anchor would typically be attached. The lengths of one or both of the prongs 150 can be varied to allow selection for a specific thickness of wallboard. The curved prong 150 can have a fixed radius of curvature, or have varying radii of curvature at various points, either discretely or continuous, along the outer profile of the prong 150 from the wall-base 151 to the outer end 152. The curvature produces a tip distance from the top edge 151a of the prong base 151 to a plane parallel to the outer end 152, with greater curvature producing a greater tip distance. While not wishing to be bound by theory or relation solely to gypsum wallboard, it is believed that an increase in tip distance leads to an increase in the weight that may be mounted on the anchor 100. In one exemplary embodiment, the tip distance is about 0.15 inches. In depicted implementations, the prongs 150 are downwardly curved, in that the end 152 is closer than the bottom edge 151b to a plane including the bottom edge 114 of the base plate 110. In other circumstances, one or more prongs may include an upward curve, in that the end 152 is closer than the top edge 151a to a plane including the top edge 113 of the base plate 110.

The prongs 150 may include one or more flat surfaces and may comprise different cross-sectional shapes and combination of shapes (e.g., rectangular, circular, ovular, triangular etc.). For instance, an upper surface of a prong may be rounded, with a planar bottom surface to prevent crack propagation in the wallboard. The flat surface can also aid in the prevention of pullout due to stress concentrations on the wallboard. In the embodiment depicted in FIGS. 1-4, each prong 150 includes opposing, substantially planar side surfaces 156, each side surface extending in a plane generally orthogonal to the base plane "P". In other implementations, one or both edges 158 of the prong may be serrated.

Each of the prongs 150 include a height 155 and a thickness at the base 151. The thickness is measured in a direction parallel to the top edge 113 (e.g., the x-direction) and corresponds to the distance between prong side surfaces 156. A comparison of height 155 to thickness defines a prong aspect ratio. In presently preferred implementations, the aspect ratio is at least 1.5:1, at least 2:1; at least 3:1. In one exemplary embodiment, the height 155 can be about 0.10 inches and the thickness can be about 0.022 inches, resulting in a prong aspect ratio of 4.55:1. In other exemplary embodiments, the height 155 can be about 100 mils, and the thickness can be about 50 mils, resulting in an aspect ratio closer to 2:1. Typically the prong aspect ratio is no greater than about 5:1, and in other embodiments no greater than about 4:1. As further described below, the relatively thin nature of the prongs 150 reduces the needed insertion force, while the wallboard itself serves to prevent the buckling of the prong 150 as it is inserted. Relying on the wall to prevent buckling allows for the anchor to hold progressively heavier objects. The curved prongs 150 can taper in height over all or a portion of the arc length from base 151 to end 152 or can have a generally uniform height over the length as depicted.

Without wishing to be bound by theory, the prong aspect ratio can change the failure mode of the anchor by enhancing the strength of the prong in load-bearing directions (e.g., towards the bottom edge 114). The enhanced strength acts against the bending on the prong while the mounting of progressively heavier objects, such bending otherwise potentially resulting in the destruction of the wallboard before the prong yields. A relatively high aspect ratio prong can accordingly perform to user expectations for more typical mounting hardware (e.g., nails, screws, etc.) while still reducing the work needed to install.

In the illustrated embodiment, and as can be seen particularly clearly from FIGS. 1 and 2, the prongs 150 can be formed from a monolithic piece of material that has been bent or otherwise articulated at select locations to form both base plate section 120 and prongs 150. Thus, each of the prongs 150 includes at least one section that is integral and substantially coplanar with a side edge 115, 116 of the frame 110. In other embodiments, one or more of the prongs may be soldered, welded, or otherwise attached to the back surface 112 of the frame 110 at an edge 115, 116 or other location spaced from the recess 130. Any of the prongs 150 may be previously articulated when provided to a user, or the user may opt to bend each of the wall-penetrating components to the user's liking.

As depicted, both the prongs 150 extend to coplanar endpoints and prongs 150 each include the same radius of curvature. In alternative embodiments, either of the prongs 150 may be offset from the other along the length of the respective edge 115, 116, such that one prong base 151 is nearer to the top edge 113 than the other. Furthermore, the base plate 110 may include one or more prongs in addition to the depicted pair of prongs 150; such additional prong(s) may feature the same or different radius of curvature, prong aspect ratio, outer end plane, length, or position alongside a side edge 115, 116 or back surface 112 of the base plate 110. The additional prongs may increase the weight hanging capabilities of the anchor but may result in additional damage to a wall surface on installation. Moreover, the plurality of insertion points provided by multiple prongs can improve the stability of an anchor during installation, use, and removal.

Both the first load bearing projection 170 and second load bearing projection 180 extend outward from the front surface 111 of the base plate 110 and are aligned along the central longitudinal axis of the anchor 100. The first and second load bearing projections 170, 180 as depicted are hooks including a base 172, 182. The load bearing structures used on the plate 110 may instead include a button, a ledge, a shank, or any number of load bearing structures used to hang articles. Furthermore, an anchor 100 may include three or more load bearing structures aligned along a longitudinal axis, a latitudinal axis, or both. In other embodiments, the front face of the base plate may feature a layer of adhesive (described in further detail below). As can be seen in FIG. 2, the second projection 180 is disposed on the front face 111 such that the hook base 182 is located above the bottom edge 151*a* of the prong base 151, while the first projection 170 is disposed on the front face 111 such that the hook base 172 is located below the bottom edge 151*a* of the prong base 151. It should be appreciated, however, that the projections 170, 180 may be placed at any desired location on the front face 111, though such placements may reduce the shear holding capacity of the anchor and limit the type of objects that may be mounted thereon.

Like the prongs 150, the first and second load bearing projections 170, 180 can be formed from a monolithic piece of material that has been bent or otherwise articulated at select locations to form both base plate section 120 and the load bearing structures 170, 180. The hooks 170, 180 can be created, for example, by cutting (e.g., die stamping, laser cutting, etc.) a portion of the base plate 110 along a path to form a hook outline, which can then be bent outwardly from the front surface 111 to form the respective projection.

Figure 4A:
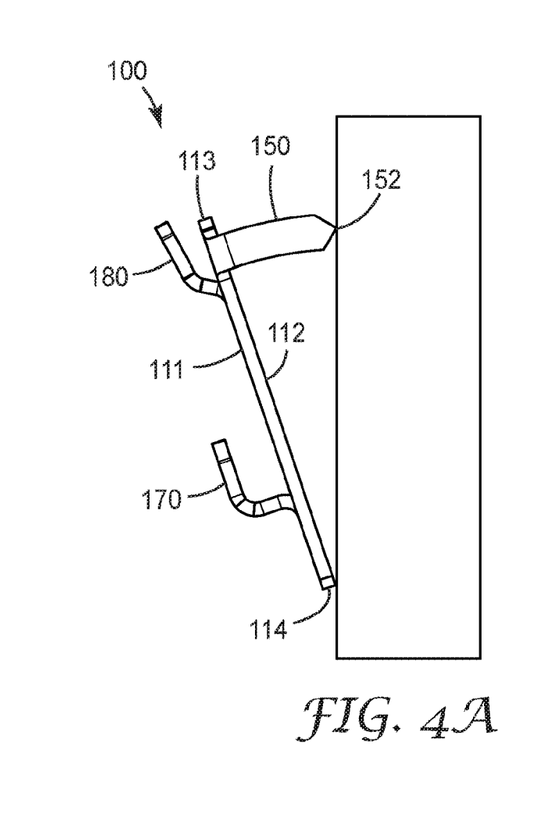
FIGS. 4A-4C are a side-view of the wall anchor of FIGS. 1-3 during and after insertion into a wall.
Figure 4B:
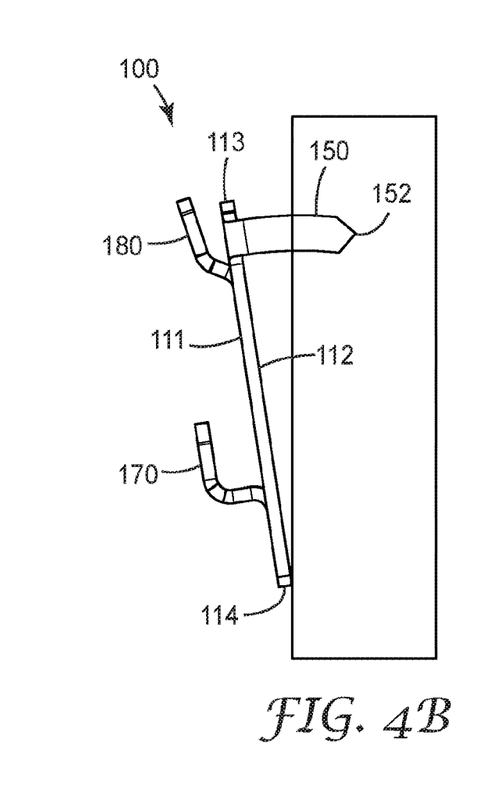
Figure 4C:
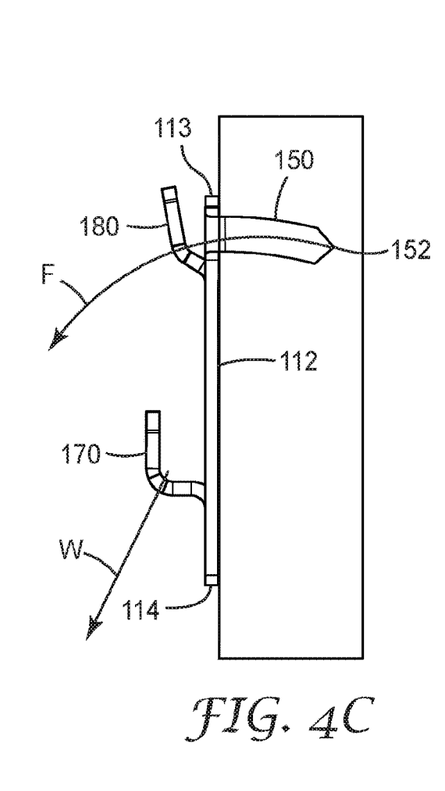

Referring to FIG. 4A-4C, one method for attaching the wall anchor 100 to a substantially vertical surface is illustrated. In a first step, the lower edge 114 is positioned at the desired location of the wall, optionally using the alignment groove 123. The anchor 100 is rotated about the bottom edge so that the outer end 152 of each curved prong 150 extends horizontally toward the wall, with the outer point 152 at a desired entry point (FIG. 4A). Force is applied in direction orthogonal to the front face 111 of the lower section 120, preferably at a location on the front face 111 adjacent each of the curved prongs 150. The orthogonal force applied results in the anchor rotating about the lower edge 114 and the outer end 152 of the prongs 150 penetrating the wallboard (FIG. 4B). Further rotation results in the remaining length of the prong being driven into the wallboard until the back surface 112 of the base plate 110 is generally flush with the wall (FIG. 4C). Notably, the hook base 182 remains substantially aligned with or spaced below the insertion point of the prong ends 152 on the wall. In embodiments featuring upwardly curved prongs, the hook base typically remains aligned with or spaced above the insertion point.

An object may be secured on either load bearing projection 170, 180 before or after the anchor 100 has been inserted into the wall. Once an object is on one or both hooks 170, 180 it has a weight "W" that creates a force moment in the rotational direction away from the wall and downward. This translates to the force "F" that provides a bias or urging outwardly of the curved prong 150. This force also operates about the lowest edge 114 of the anchor 100, which functions as a pivot. The smaller the distance between the curved prong 150 and the pivot point, the greater the force "F" urging the anchor out of the wall. As can be seen with anchor 100, however, this force is distributed through the core of the wallboard below the curved prong 150. Having the force distributed below the prong 150 presents a considerable amount of material for the prong to tear through. Accordingly, the anchor 100 is less likely to dislodge from the wall or cause considerable damage to the wallboard.

For removal, the base plate may be pulled downwards and outwards by the upper section 122. The lower edge 114 naturally pivots upon itself and the anchor is dislodged as the outer ends 152 of the prongs 150 exit the wall. The upper section 120 may feature structures in addition to or in lieu of hook 180 at the upper edge 113 to assist removal, such as a boss that can be engaged with a screwdriver, key or other implement, or a tab that may be engaged by a human finger.

In presently preferred implementations, the anchor is made of a metal containing material, however, it can be appreciated that other suitable materials can be used. The anchor 100 is typically made from a resilient metal or metal alloy, such as stainless steel, titanium, cobalt-chromium alloy (such as manufactured by Elgiloy Specialty Metals, Elgin, IL), or a shape-memory alloy such as an alloy of nickel and titanium (e.g., Nitinol). Preferably, the anchor 100 is sufficiently resilient so that the shape when relaxed does not significantly change during the course of mounting an object. As another option, the anchor 100 could be made from any other resilient material known to one skilled in the art, such as a flexible polymer or composite material. Moreover, although the anchor 100 is specifically discussed as mountable on a wall of gypsum wallboard, it can be utilized with walls of other materials or to secure an object to something other than a wall.

Figure 5:
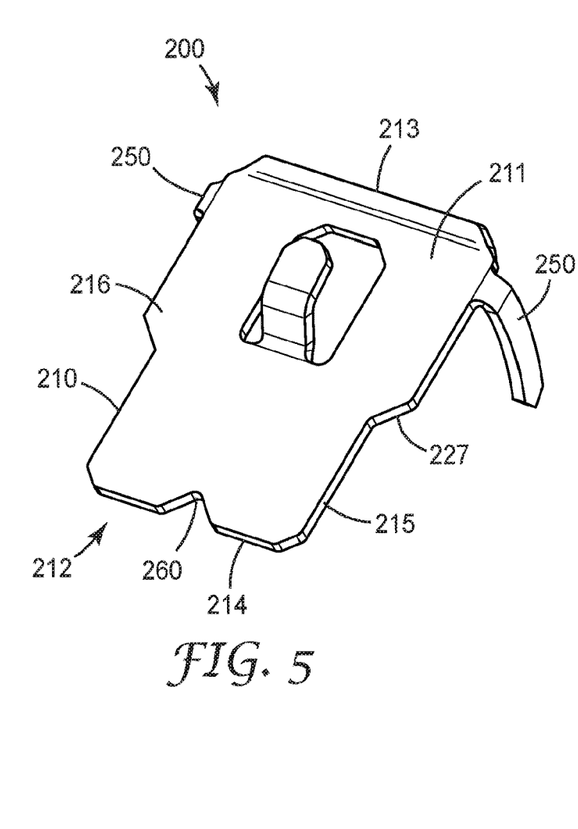
FIG. 5 illustrates a perspective view of a wall anchor assembly, according to another embodiment of the present disclosure.
Figure 6:
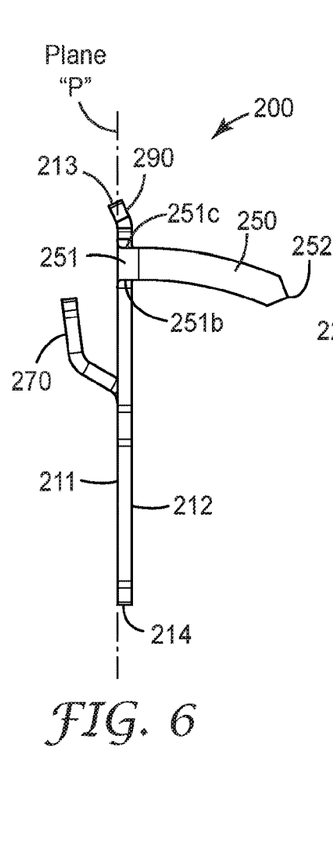
FIG. 6 is a side-view of the wall anchor of FIG. 5.
Figure 7:
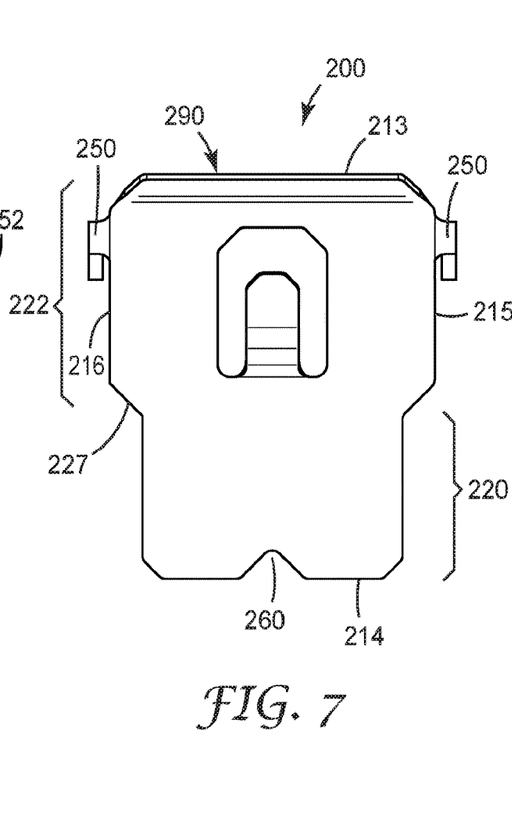
FIG. 7 is a front planar view of the wall anchor of FIGS. 5-6.

Turning to FIGS. 5-7, another embodiment of a wall anchor 200 according to the present disclosure is depicted. The wall anchor 200 includes a base plate 210 including a front surface 211 opposing a back, wall-facing surface 212. A pair of downwardly curved prongs 250 extend from each side edge 215, 216 in direction generally orthogonal to the back surface 212. The base 210 includes a lower section 220 and an upper section 222. The sections 220 and 222 are typically coplanar and include front surfaces residing in a plane "P". It is to be understood that many other aspects of anchor 200 may have similar form and function to those described with respect to anchor 100 and these need not be repeated.

In slight departures from the anchor 100, the base plate 210 includes a taper 227 between the upper section 222 and the lower section 220. The lower section 220 thus features a smaller width 220a than that of the upper section. The upper edge 213 is also bent outward in a direction away from the front surface 211 and plane P, providing a rear purchase 290 that may be useful in removal of the anchor 200 from the wall. Also, a single load bearing structure 270 and recess 230 are disposed in the upper section 222, with the base 272 of the hook disposed below the base of the prong 250.

Figure 8:
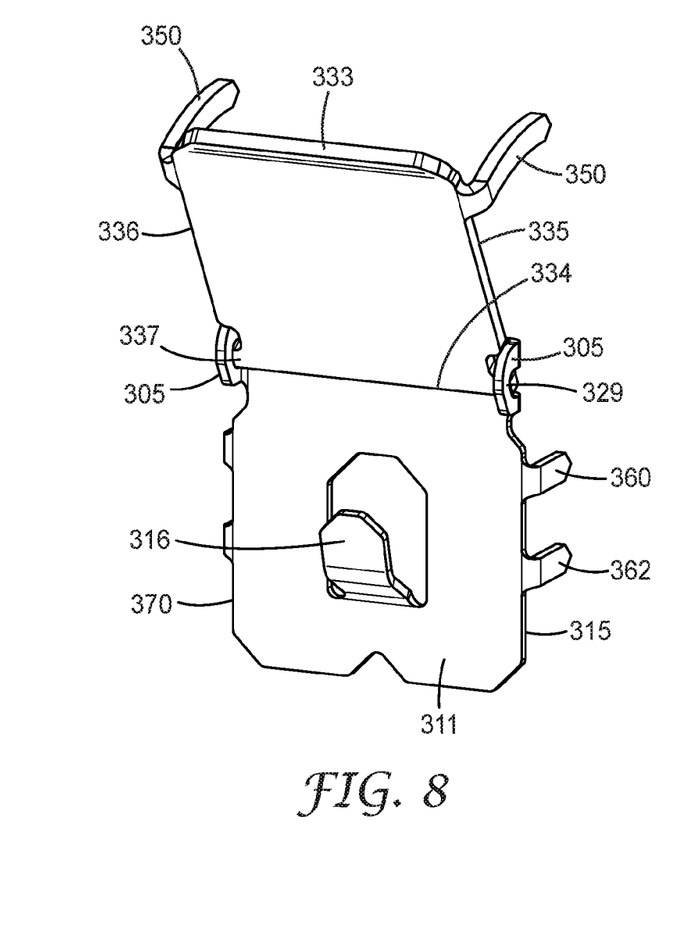
FIG. 8 illustrates a perspective view of a wall anchor assembly, according to yet another embodiment of the present disclosure.
Figure 9:
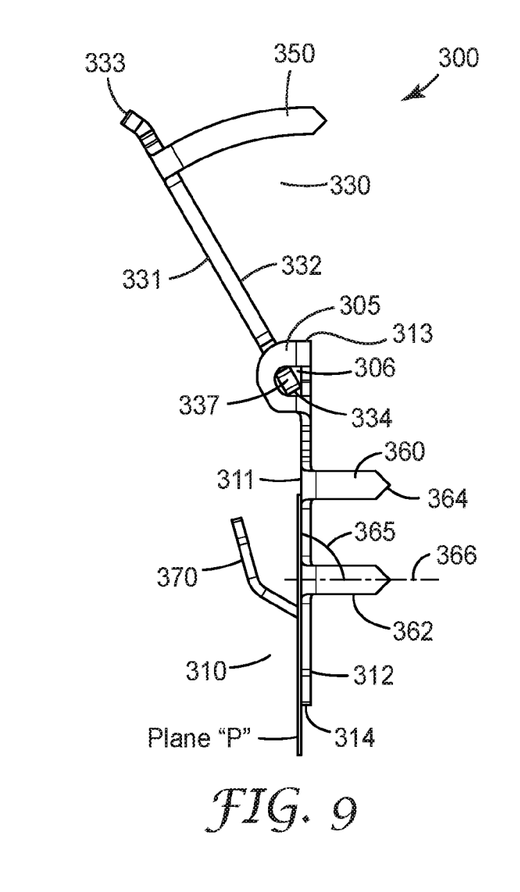
FIG. 9 is a side view of the wall anchor assembly of FIG. 8.
Figure 10:
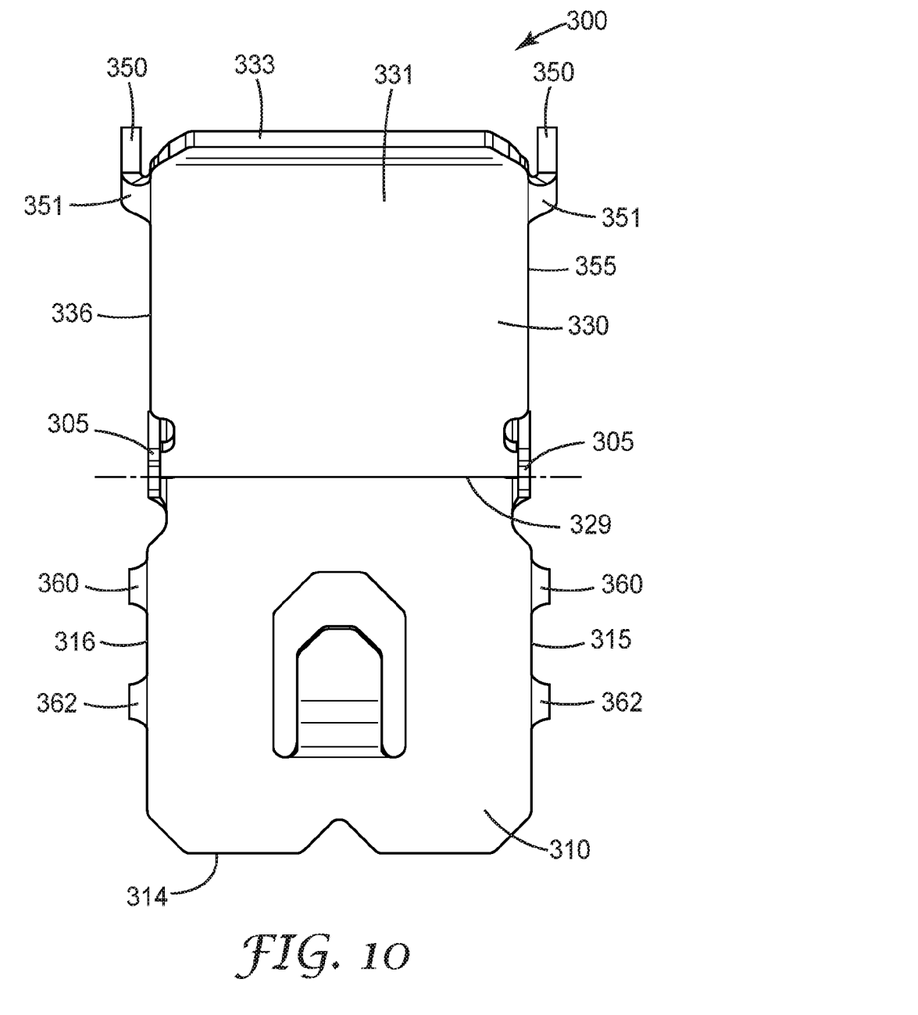
FIG. 10 is a front planar view of the wall anchor assembly of FIGS. 9-10.

Yet another embodiment of a wall anchor 300 according to the present disclosure is depicted in FIGS. 8-10. The anchor 300 includes two pivotally coupled plates that can cooperate in the mounting of relatively heavier weight object. The wall anchor 300 includes a base plate 310 and an insert plate 330 pivotally coupled to the base plate 310 at hinge segments 329 adjacent the top edge 313 of the base plate 310. The base plate includes a front surface 311, a back surface 312, a bottom edge 314, and side edges 315, 316. Both the front 311 and back surfaces 312 are substantially planar, with the front surface 311 residing in a frame plane "P". A deployed load bearing projection 370 extends outward in a direction away from the front surface 311. A pair of hinge guides 305 defining apertures 306 extend outwardly from the front surface 311. It is to be understood that many other aspects of anchor 300 may have similar form and function to those described with respect to anchor 100 and 200, and these need not be repeated.

The insert plate 330 includes a front surface 331, a back surface 332, a top edge 333, and a bottom edge 334. A pair of legs 337 extend outwardly from the side edges 335, 336 adjacent bottom edge 334 and couples the insert plate 330 to apertures 306 in hinge guides 305 to form a hinge segment 329. The hinge segment 329 allows the base plate 310 and insert plate 330 to pivot relative to one another along a hinge axis. The hinge guide 305 and apertures 306 may include geometry or other structures designed to limit the rotation of the insert plate away from the wall, such as a triangular, trapezoidal or other shape with linear stop surfaces. In alternative embodiments, the insert plate 330 may be coupled to the base plate 310 by one or more hinge pins, living hinges, or like structures to provide pivotal movement. The apertures 306 may include geometry designed to limit the rotation of the insert plate away from the wall, such as a triangular, trapezoidal or other shape with linear stop surfaces.

The insert plate 330 includes a pair of curved prongs 350, each extending from one of the side edges 315, 316 adjacent to the distal, top edge 313. The hinge segment 329 can be spaced from the prong base 351 such that the hinge segment 329 can be located at the radial center of an arc defined by the curved prong. Such spacing may, in certain embodiments, help in demanding that the prongs 350 are inserted along an appropriate curved path.

The base plate 310 includes two pairs of linear shanks 360, 362 extending from the opposing side edges 315, 316. The shanks 360, 362 each extend to a pointed outer end 364, 366 over a length that is generally less than the thickness of the wallboard to which the anchor would typically be attached. The lengths of shanks 360, 362 can be varied to allow selection for a specific thickness of wallboard, though the curved prongs 350 on the insert plate typically having linear or arc length that is at least twice that of the length of the shanks 360, 362. As depicted, all of the shanks 360 and 362 extend to coplanar endpoints and have the same length. In other embodiments not depicted, the shanks 360 may be longer than shanks 362 or vice versa. In yet other embodiments, the either of the shanks in a given shank pair 360, 362 may be offset from the other along the length of the respective edge 315, 316, such that one shank base is nearer to the top edge 313 than the other companion shank.

The shanks 360, 362 form an angle 365 with the back surface 312 of the base. By way of example, angle 365 (e.g., taken relative to a plane parallel to the frame plane "P") may be between about 75 degrees and about 90 degrees (such as between about 80 degrees and about 90 degrees or between about 85 degrees and about 90 degrees), though variations are possible. In presently preferred implementations, the shanks 360, 362 extend generally along a plane that is substantially orthogonal to the frame plane "P". Without wishing to be bound by theory, providing an excessively acute angle between a shanks 360, 362 and the back surface 312 may tend to shear gypsum wall board. A slightly acute angle (e.g., an angle 165 of 80 degrees or greater), however, may ease insertion of the base plate 300 and assist in drawing the back surface 112 substantially parallel to the wall in certain embodiments. Like prongs 350, shanks 360, 362 can be formed from a monolithic piece of material that has been bent or otherwise articulated at select locations to form both base plate 310 and shanks 360, 362. Thus, all of the shanks 360, 362 include at least one section that is integral and substantially coplanar with a side edge 315, 316 of the base plate 110. In other embodiments, one or more of shanks may be soldered, welded, or otherwise attached to the back surface 312 of the base plate 310 at an edge 315, 316 or other location spaced from the recess 330. Any of the shank pairs 360, 362 may be previously articulated when provided to a user, or the user may opt to bend each of the wall-penetrating components to the user's liking.

In lieu of or in addition to shanks 360, 362, a back surface 312 of the base plate 310 can include an adhesive construction for temporarily securing the insert plate 330 to a wall surface. The use of a removable adhesive on the base plate 310 allows for a user to adjust the position of the base plate 310 before committing to the location of the anchor 300 or otherwise puncturing the wall. For example, the back surface may be coupled to a Command™ Adhesive Strip or a Command™ Picture Hanging Strip, both available from 3M Company. In some embodiments, the adhesive construction can include a pressure sensitive adhesive and a backing, while in other embodiments the adhesive construction includes only a continuous or discontinuous layer of pressure sensitive adhesive. A general description of useful pressure sensitive adhesives may be found in the Encyclopedia of Polymer Science and Engineering, Vol. 13, Wiley-Interscience Publishers (New York, 1988). Additional description of useful pressure-sensitive adhesives may be found in the Encyclopedia of Polymer Science and Technology, Vol. 1, Interscience Publishers (New York, 1964). Pressure sensitive adhesive compositions are well known to those of ordinary skill in the art to possess properties including the following: (1) tack, (2) adherence with no more than finger pressure, (3) sufficient ability to hold onto an adherend, and (4) sufficient cohesive strength to be cleanly removable from the adherend. Materials that have been found to function well as pressure sensitive adhesives are polymers designed and formulated to exhibit the requisite viscoelastic properties resulting in a desired balance of tack, peel adhesion, and shear holding power. Suitable PSAs may be based on crosslinked or non-crosslinked (meth) acrylics, rubbers, thermoplastic elastomers, silicones, polyurethanes, and the like, and may include tackifiers in order to provide the desired tac, as well as other additives. In some embodiments, the PSA is based on a (meth)acrylic PSA or at least one poly(meth)acrylate, where (meth)acrylate refers to both acrylate and methacrylate groups. In some embodiments, the PSA is an olefin block copolymer-based adhesive.

The adhesive construction used on the insert plate 330 may be peelable or stretch releasable. In embodiments featuring a stretch releasable construction, the construction can be removed from a surface by stretching it at an angle of less than 35°. In embodiments featuring a peel-releasable construction, the adhesive can be removed from a wall surface by stretching it an angle of 35° or greater. In some embodiments, the releasable adhesive may be removed by a combination of stretch and peel-release mechanisms.

An insert plate 330 featuring one or more stretch release adhesive constructions can include, for example, any of the adhesives and constructions described in any of the following patents: U.S. Pat. No. 5,516,581 (Kreckel et al.); U.S. Pat. No. 6,231,962 (Bries et al.); U.S. Pat. No. 7,078,093 (Sheridan et al.); U.S. Pat. No. 6,395,389 (Lühmann et al.); and US Patent Publication No. 2016/0068722 (Schmitz-Stapela et al.), all of which are incorporated by reference herein in their entirety.

An insert 350 featuring one or more peelable adhesive constructions can include, for example, any of the adhesives and constructions described in any of the following patent applications: International Publication Nos. 2015/035556, 2015/035960, U.S. Patent Application No. 2015/034104, and PCT Application Nos. US2017/015163 and US2017/014733, all of which are incorporated herein in their entirety.

The adhesive construction may further include one or more release liners. The release liner can be, for example, on either or both of major surfaces of the adhesive layers. The release liner protects the adhesive during manufacturing, transit, and before use. When the user desires to use the adhesive construction, the user can peel or remove the release liner to expose the adhesive. Examples of suitable liners include paper, e.g., kraft paper, or polymeric films, e.g., polyethylene, polypropylene or polyester.

To use anchor assembly 300, a user first optionally removes a release liner from any adhesive construction on the base plate 310, if such an adhesive/liner combination is present. The base plate 310 is then placed at the desired location and secured to the wall surface using finger pressure in the direction of the wall. Such pressure drives the shanks 360, 362 into the wall and/or causes an initial adhesion to form between the adhesive construction and the wall surface. Once the user is satisfied with the location of the base plate 310, force is applied in direction orthogonal to the front face 331 of the insert plate 330. The orthogonal force applied results in the anchor rotating about the hinge segment 329 and the outer end 352 of the prongs 350 penetrating the wallboard. Further rotation results in the remaining length of the prongs 350 being driven into the wallboard until the back surface 332 of the insert plate 330 is generally flush with the front surface 311 of the base plate 310.

The wall anchors and assemblies of the present disclosure can be used even in instances where the object does not include a wire but instead includes a different backing hardware configuration. Exemplary backing hardware configurations include, but are not limited to, a "D"-ring, saw-tooth, key-hole hangers, etc.

The wall anchors of the present disclosure may be used to mount myriad items and objects to surfaces such as painted drywall, plaster, concrete, glass, ceramic, fiberglass, metal or plastic. Items that can be mounted include, but are not limited to, wall hangings, organizers, holders, baskets, containers, decorations (e.g., holiday decorations), calendars, posters, dispensers, wire clips, guitars, floating shelves, curtain rods, heavy-duty hooks, brackets, wall sconces, and carrying handles.

The patents, patent documents, and patent applications cited herein are incorporated by reference in their entirety as if each were individually incorporated by reference. It will be apparent to those of ordinary skill in the art that various changes and modifications may be made without deviating from the inventing concepts set from above. Thus, the scope of the present disclosure should not be limited to the structures described herein. Those having skill in the art will appreciate that many changes may be made to the details of the above-described embodiments and implementations without departing from the underlying principles thereof. Further, various modifications and alterations of the present invention will become apparent to those skilled in the art without departing from the spirit and scope of the invention. The scope of the present application should, therefore, be determined only by the following embodiments and equivalents thereof.

We claim:

1. A wall anchor comprising:
   a base plate including opposing front and back surfaces, a top edge, a bottom edge and two opposing side edges;
   a downwardly curved prong having a base, wherein the prong extends outwardly along an arc to a wall-penetrating outer end;
   a load bearing structure adjacent the top edge; and
   an alignment notch at the bottom edge,
   wherein the base of the prong is integral with one of the opposing side edges, wherein the base of the prong has a height measured along the side edge and a thickness measured along the top edge, and wherein the height is a least 1.5 times the thickness.

2. The wall anchor of claim 1, wherein the base of the prong is adjacent the top edge.

3. The wall anchor of claim 1, wherein the load bearing structure comprises a hook, and wherein the bottom of the hook is disposed in a plane parallel to or below a top edge of the base of the prong.

4. The wall anchor of claim 1, wherein the height is at least twice the thickness.

5. The wall anchor of claim 1, wherein the height is no greater than 4 times the thickness.

6. The wall anchor of claim 1, wherein the prong curves downwardly in the direction of the bottom edge.

7. The wall anchor of claim 1 and further including a second curved prong extending outwardly along an arc to an outer end, and wherein the outer end of the first prong and the outer end of the second prong are coplanar.

8. The wall anchor of claim 7, wherein each prong curves downwardly in the direction of the bottom edge of the base plate.

9. A wall anchor assembly comprising:
   a base plate; and
   a first insertion plate pivotally coupled to the base plate and including a proximal edge, a distal edge, and opposing side edges, the insertion plate further including
      a curved prong having a base, wherein the prong extends outwardly along an arc to a wall-penetrating outer end, and wherein the base of the prong is coincident with one of the opposing side edges.

10. The wall anchor assembly of claim 9, wherein the base plate includes opposing first and second major surfaces, and at least one shank extending to a wall-penetrating outer end.

11. The wall anchor assembly of claim 10, wherein the base plate includes at least one pair of shanks extending to a coplanar outer end.

12. The wall anchor assembly of claim 11, wherein the base plate includes two pairs of shanks, each pair extending to a coplanar outer end.

13. The wall anchor assembly of claim 9, wherein the base plate is pivotally coupled to the insertion plate at a first hinge segment.

14. The wall anchor assembly of claim 13, wherein the base of the prong is disposed on the side edge of the insertion plate at a location distal to both the hinge segment and the base plate.

15. The wall anchor assembly of claim 9, wherein the base of the prong has a height measured along the side edge and a thickness measured along the top edge, and wherein the height is a least three times the thickness.

16. The wall anchor assembly of claim 9, wherein the insertion plate is rotatable in the direction away from the front surface of the base plate to insert the curved prong into a surface.

17. The wall anchor assembly of claim 9 and further including a second curved prong extending outwardly along an arc to an outer end.

18. The wall anchor assembly of claim 17, wherein the outer end of the first prong and the outer end of the second prong are coplanar.

19. The wall anchor assembly of claim 9 wherein the assembly is adjustable between an open state and a closed state, and wherein the first insertion plate includes a rear surface residing in a plane substantially parallel to a front surface of the base plate in the closed state.

* * * * *

UNITED STATES PATENT AND TRADEMARK OFFICE
CERTIFICATE OF CORRECTION

| | | |
|---|---|---|
| PATENT NO. | : 12,213,605 B2 | Page 1 of 1 |
| APPLICATION NO. | : 17/637542 | |
| DATED | : February 4, 2025 | |
| INVENTOR(S) | : Joseph A Hoffman et al. | |

It is certified that error appears in the above-identified patent and that said Letters Patent is hereby corrected as shown below:

In the Claims

Column 10
Line 65, In Claim 1, delete "a least" and insert -- at least --, therefor.

Column 12
Line 14, In Claim 15, delete "a least" and insert -- at least --, therefor.

Signed and Sealed this
Twenty-second Day of July, 2025

Coke Morgan Stewart
*Acting Director of the United States Patent and Trademark Office*